US012719859B1

(12) United States Patent
Truong et al.

(10) Patent No.: US 12,719,859 B1
(45) Date of Patent: Aug. 25, 2026

(54) MODULAR, METADATA-DRIVEN ARCHITECTURE FOR IMPLEMENTING ARTIFICIAL INTELLIGENCE AGENTS

(71) Applicant: WEX Inc., Portland, ME (US)

(72) Inventors: Sonny Truong, Daytona Beach, FL (US); Deepak Yadav, Bangalore (IN); Kaushik Kumar Mahato, Bangalore (IN); Aditya Rawat, Chicago, IL (US); Luiz Gustavo Giacomelo Quinelato, San Paolo (BR); Nitin Ahuja, San Francisco, CA (US)

(73) Assignee: WEX, Inc., Portland, ME (US)

( * ) Notice: Subject to any disclaimer, the term of this patent is extended or adjusted under 35 U.S.C. 154(b) by 0 days.

(21) Appl. No.: 19/531,158

(22) Filed: Feb. 5, 2026

(51) Int. Cl.
*H04L 9/40* (2022.01)
*G06F 9/54* (2006.01)

(52) U.S. Cl.
CPC ............ *H04L 63/083* (2013.01); *G06F 9/541* (2013.01)

(58) Field of Classification Search
CPC ............................... H04L 63/083; G06F 9/541
USPC .............................................................. 726/4
See application file for complete search history.

(56) References Cited

U.S. PATENT DOCUMENTS 10,719,374 B1 * 7/2020 Mathur ................. G06F 16/252
10,733,088 B1 * 8/2020 Sommers ............ G06F 11/3688
12,248,467 B1 3/2025 Pendar et al.
12,386,994 B1 8/2025 DeWeese et al.
2006/0248038 A1 * 11/2006 Kaplan ................. G06F 16/164
2019/0065613 A1 * 2/2019 Bilsten .................. G06F 16/986
2019/0087198 A1 * 3/2019 Frascati ................... H04N 9/79
2020/0327137 A1 * 10/2020 Farver ................. G06F 16/1805
2021/0044976 A1 * 2/2021 Avetisov ............... H04W 12/08
2022/0255931 A1 * 8/2022 Avetisov .............. H04L 9/3247
2024/0273411 A1 8/2024 Mueck et al.
2025/0245030 A1 7/2025 Cyjon et al.

FOREIGN PATENT DOCUMENTS

CN 119861916 A 4/2025
DE 202025102541 U1 6/2025
IN 202541041233 5/2025

* cited by examiner

*Primary Examiner* — Teshome Hailu
(74) *Attorney, Agent, or Firm* — Pierce Atwood LLP

(57) ABSTRACT

A computing system may receive file data corresponding to an application programming interface (API) specification for an API. The computing system may extract metadata associated with API specification from the file data, the metadata associated with an API endpoint of the API. Based on the metadata, a generative model of the computing system may generate an executable function associated with the API endpoint, the executable function configured for use by a second generative model to generate an API call to the API endpoint. The computing system may implement the executable function.

17 Claims, 10 Drawing Sheets

FIG. 1

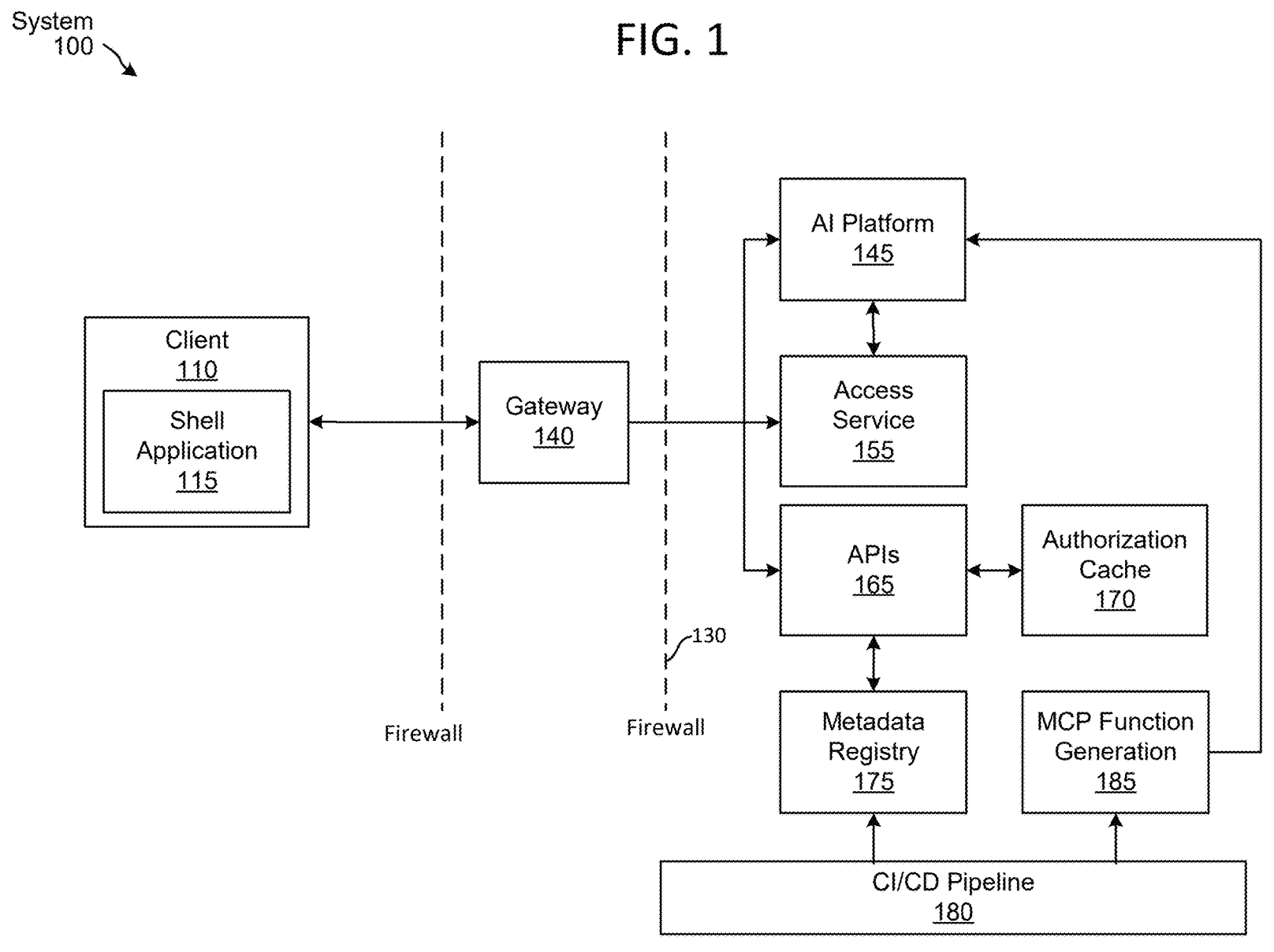

System 100

Client 110

Shell Application 115

Firewall

Gateway 140

Firewall

130

AI Platform 145

Access Service 155

APIs 165

Metadata Registry 175

Authorization Cache 170

MCP Function Generation 185

CI/CD Pipeline 180

FIG. 2

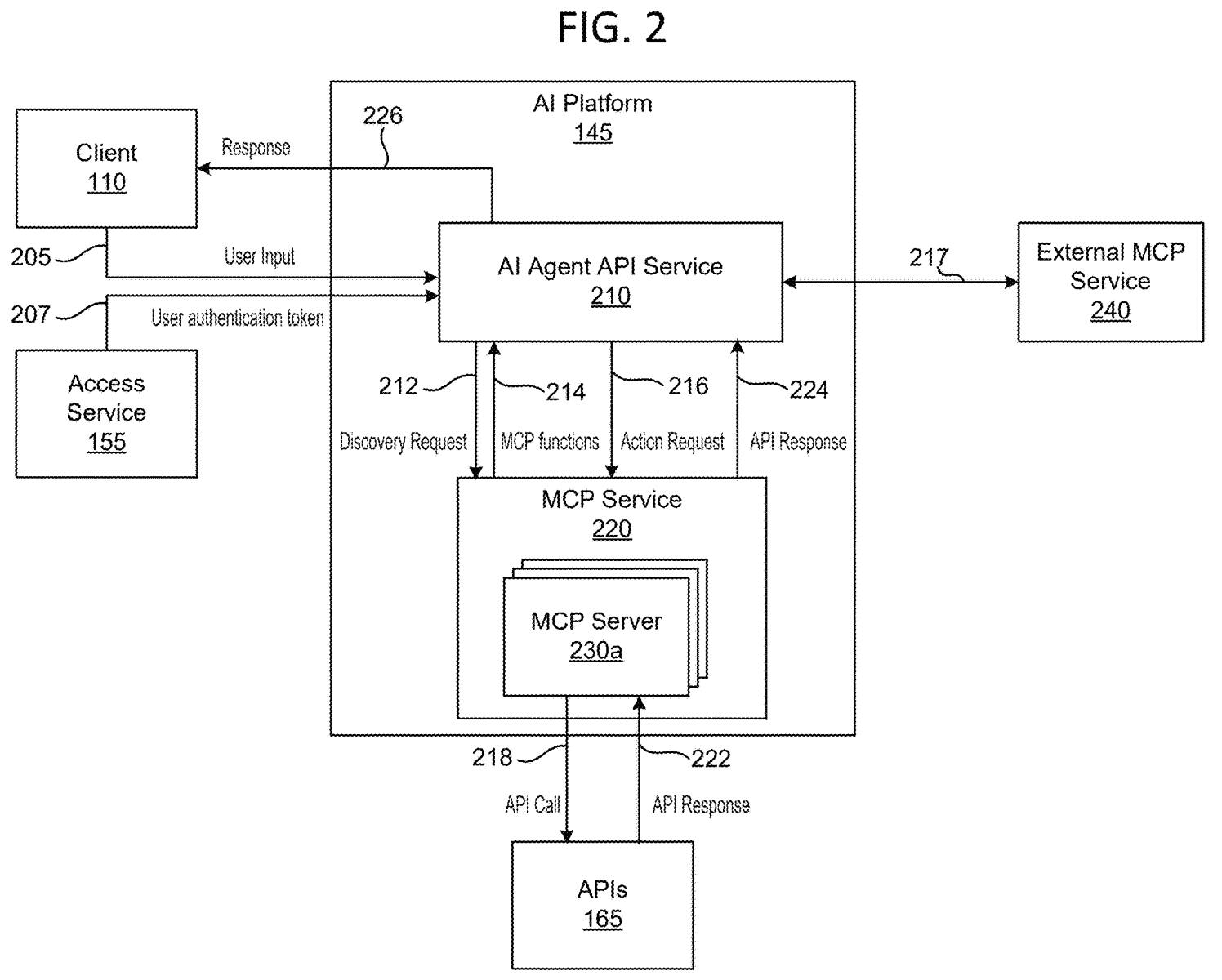

External MCP Service 240

217

AI Platform 145

AI Agent API Service 210

MCP Service 220

MCP Server 230a

APIs 165

Client 110

Access Service 155

224 API Response

216 Action Request

214 MCP functions

212 Discovery Request

222 API Response

218 API Call

226 Response

205 User Input

207 User authentication token

AI Platform 145
MCP Service 220
MCP Server 230a
Generated MCP functions
355
MCP Function Generation 185
MCP Function Testing 350
Generated MCP functions
345
327
Embedding Model 320
Metadata embedding
325
Vector Database 330
Metadata embedding
329
MCP Function Generation Model 340
Metadata Registry 175
API Specification Metadata
310
API Specification Metadata
315
Input File
305
CI/CD Pipeline 180

MODULAR, METADATA-DRIVEN ARCHITECTURE FOR IMPLEMENTING ARTIFICIAL INTELLIGENCE AGENTS

BACKGROUND

Various systems have been developed for enabling interaction between an artificial intelligence (AI) agent and application programming interfaces (APIs) accessible to a system. In some such systems, the AI agent may identify API endpoints with which the AI agent can interact to perform actions responsive to user inputs, and the AI agent may generate executable API calls for the APIs to perform such actions.

SUMMARY

This Summary is provided to introduce a selection of concepts in a simplified form that are further described below in the Detailed Description. This Summary is not intended to identify key features or essential features, nor is it intended to limit the scope of the claims included herewith.

In some aspects, the techniques described herein relate to a method including receiving, by a computing system and from a client device, a user input; determining, by the computing system, a user authentication token corresponding to a user profile associated with the user input; generating, by a generative model of the computing system, an API call for a first API to perform an action responsive to the user input, the API call including the user authentication token; executing, by the computing system, the API call to cause the first API to perform the action in accordance with the user authentication token; based on executing the API call, receiving, by the computing system, API response data corresponding to performance of the action by the first API; based on the API response data and the user input, generating, by the generative model, model output data corresponding to a response to the user input; and causing, by the computing system, an interface of the client device to present output data corresponding to the model output data.

In some aspects, the techniques described herein relate to a method including receiving, by a computing system, file data corresponding to an API specification for an API; extracting, by the computing system, metadata associated with API specification from the file data, the metadata associated with an API endpoint of the API; based on the metadata, generating, by a first generative model of the computing system, an executable function associated with the API endpoint, wherein the executable function is configured for use by a second generative model to generate an API call to the API endpoint; and implementing, by the computing system, the executable function.

In some aspects, the techniques described herein relate to a system including one or more processors; and one or more computer-readable mediums encoded with instructions which, when executed by the one or more processors, cause the system to: receive file data corresponding to an API specification for an API; extract metadata associated with API specification from the file data, the metadata associated with an API endpoint of the API; based on the metadata, generate, by a first generative model, an executable function associated with the API endpoint, wherein the executable function is configured for use by a second generative model to generate an API call to the API endpoint; and implement the executable function.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 1 shows an example implementation of a system configured in accordance with some embodiments of the present disclosure.

FIG. 2 shows an example implementation of an artificial intelligence (AI) platform component configured in accordance with some embodiments of the present disclosure.

DETAILED DESCRIPTION

Figure 3:
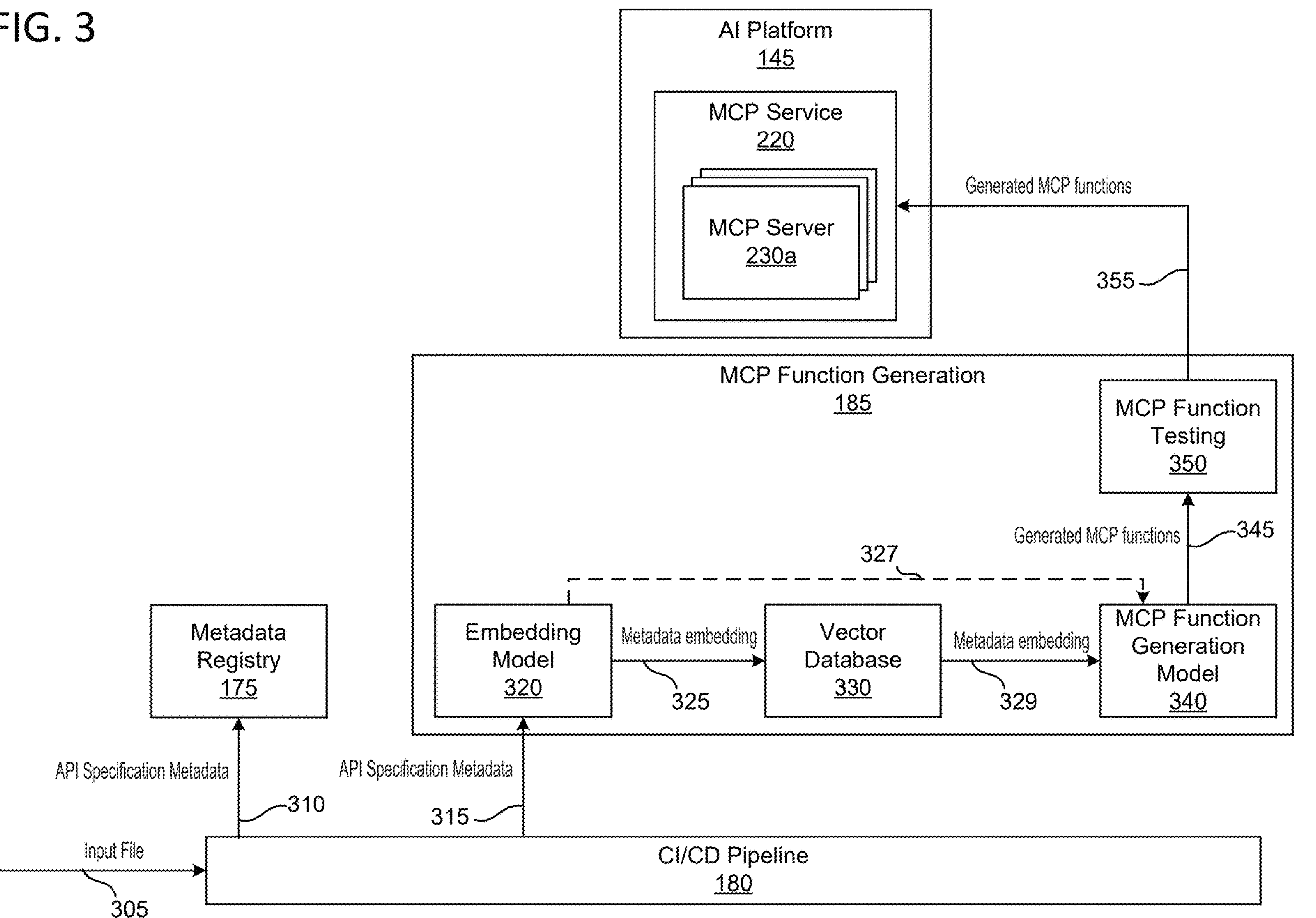
FIG. 3 shows an example implementation of a modular context protocol (MCP) function generation component configured in accordance with some embodiments of the present disclosure.

Artificial intelligence (AI) agents may be implemented as a medium between a user and a system. Rather than manually navigating and interacting with the system itself (e.g., via user interfaces of an application or webpage), a user may instead interact with an AI agent of the system, which may interact with the system on behalf of the user. In a typical scenario, the user may provide a user input including a request for the AI agent to perform an action, and the AI agent may interact with backend application programming interfaces (APIs)/API endpoints of the system to cause performance the action.

In some existing systems, an AI agent implemented by a system may determine an API (or API endpoint) to be used in response to a user input from a static list of APIs or endpoints hardcoded into the agent's logic. When determining how to respond to a user input, the AI agent may select an API (or API endpoint) from the list to perform an action in response to the user input.

In other existing systems, an AI agent may interact with a model context protocol (MCP) server to discover MCP functions (sometimes referred to as MCP tools) representing system functionality (e.g., APIs or API endpoints) that may be used to respond to a user input. During the discovery process, the AI agent may not be limited to the same system functionality as a user would be when manually accessing functionalities of the system. Rather, the AI agent may have access to various MCP functions implemented by the MCP server, corresponding to various system functionalities, from which the AI agent may select an MCP function most relevant to the user input. Based on the selected MCP function, the AI agent may generate an API call to an API (e.g., to an API endpoint of the API) associated with the MCP function to perform the action responsive to the user input.

Some such existing systems may manually implement and maintain (e.g., by a developer) MCP servers and corresponding MCP functions for access by the AI agent. For example, as additional functionality is added to the system (e.g., access to a new API, additional API endpoints for an existing API, etc.), additional MCP servers and/or corresponding MCP functions must be developed to enable the AI agent access to the new system functionality. The inventors have recognized and appreciated several potential problems with such designs.

One potential problem is that such designs may enable the AI agent to have access to APIs (or API endpoints) that the user would not be permitted to access. For example, AI agents hardcoded with information associated with APIs may consider each of the APIs (or corresponding API endpoints) when selecting an API (or API endpoint) to perform an action responsive to the user input. For further example, AI agents interacting with MCP servers may be provided access to most or all APIs (or API endpoints) of the system. Enabling the AI agent to have such access, rather than limiting the access of the AI agent to APIs (or API endpoints) having the same system functionality access as the corresponding user, may result in the AI agent performing actions associated with system functionality that the user does or would not have access to. This may result in the AI agent allowing a user access to a service, information, actions, etc., that the user is not authorized to access, resulting in various security and privacy concerns. Further, this may result in the AI agent performing an incorrect or invalid action in response to the user input (e.g., outputting information or performing an action that is not responsive to the user input). Additionally, this may result in an increase in latency in the processing of the AI agent, as the AI agent may have to evaluate the relevancy of (MCP functions associated with) APIs (or API endpoints) that correspond to system functionality that is irrelevant to the user input or is not authorized for access by the user in the first place.

Another potential problem is that such designs may struggle with discovering and using relevant APIs (or API endpoints) from a large and evolving set APIs. For example, AI agents hardcoded with static lists of APIs (or API endpoints) may require additional APIs (or API endpoints) to be manually added to the AI agent's logic by a developer. As such, the AI agent may be limited to the hardcoded information when generating a response to a user input, until the AI agent's logic is updated by the developer. For further example, manually implementing and maintaining MCP servers and corresponding MCP functions may result in a delay between implementation of new or modified system functionality and access to the new system functionality by the AI agent (e.g., via the corresponding MCP servers and MCP functions).

Still another potential problem is that such designs may struggle with scaling functionality of the AI agent across independently developed services or teams associated with different system functionality. For example, the APIs (or API endpoints) accessible to the AI agents may be limited to those that are related to the system functionality associated with the developer that maintains the AI agent and/or the MCP servers and corresponding MCP functions, rather than being scalable across multiple teams of developers associated with different types of system functionality.

Some embodiments of the present disclosure overcome one or more of the foregoing problems by implementing a pipeline for the automatic generation, by a generative model, of MCP servers and MCP functions corresponding to API functionality (e.g., additional APIs, additional API endpoints, etc.) to be added to a system, where the MCP servers are configured to implement authentication/authorization rules for limiting the MCP functions accessible to an AI agent based on the user interacting with the system. In some implementations, the MCP servers and MCP functions may be generated using metadata extracted from an API specification file provided to the system. The metadata may be used by the generative model to generate MCP functions for interacting with the API endpoints and, in some instances, MCP servers for implementing the MCP functions. The MCP server may be configured to authenticate an identity of a user interacting with the system (e.g., using a user authentication token) and limit the MCP functions discoverable by an AI agent to MCP functions that are authorized for access by the user. Further, in some implementations, the validity of the MCP functions may be tested prior to implementation by the MCP server. Still further, in some implementations, during inference, the AI agent may provide a user authentication token to the MCP server, along with a request for MCP functions available to the AI agent. Based on a returned list of authorized MCP functions, the AI agent may generate an API call to a corresponding API endpoint for the API to perform an action responsive to a user input. The MCP server may execute the API call to cause the API to perform the action in accordance with the user authentication token. A response received from the API may be used by the AI agent to generate a response to the user input.

FIG. 1 is a block diagram illustrating an example system 100 implemented in accordance with some embodiments of the present disclosure.

As shown in FIG. 1, the system 100 may include a shell application 115 operating on a client 110. The shell application 115 may be configured to orchestrate interactions between a user and other components of the system. In some embodiments, the interactions between the user and the components of the system 100 may include interaction with one or more front-end modules (e.g., applications) of the shell application 115. The modules may be associated with different system functionalities, such as customer management, payment management, benefits management, etc. The modules may expose backend APIs (e.g., the APIs 165) and associated metadata for accessing the system functionalities associated with the modules.

The system 100 may include a gateway component 140 configured to provide access to one or more components of the system 100. Access to and past the gateway component 140 may be governed by a firewall 130. Upon accessing the shell application 115, the gateway component 140 may return a login page for a user of the client 110 to provide login credentials for a user profile authorized to access system functionalities associated with the shell application 115.

The system 100 may include an access service 155 configured to authenticate a current user interacting with the system 100. The access service 155 may use the provided login information to authenticate the user. Based on authenticating the user's login credentials, the access service 155 may determine a user authentication token corresponding to the user profile. The user authentication token may authenticate an identity of the user and include access authorization rules corresponding to the user. The access authorization rules may indicate system functionalities that the user is enabled to access. The system functionalities may include modules that the user is enabled to access, module APIs (e.g., the APIs 165) that the user is enabled to access, types of information the user is enabled to access, etc. The access service 155 may implement one or more access authentication/authorization techniques known in the art, such as Auth0, OKTA, etc.

The system 100 may include an AI platform component 145 configured to generate responses to user inputs using one or more AI agents. As described in more detail below in connection with FIG. 2, the AI platform component 145 may be configured to facilitate performance of actions by the module APIs (e.g., the APIs 165) in response to a user input. The AI platform component 145 may be configured to generate action requests (e.g., API calls, directives, commands, etc.) based on available executable functions (e.g., MCP functions) configured to interact with the module APIs. The AI platform component 145 may take as input a user input (e.g., provided to the shell application 115) and the user authentication token (e.g., determined by the access service 155) corresponding to the user profile. The AI platform component 145 may be configured to use the user authentication token to enforce the access authorization rules corresponding to the user.

The system 100 may include the APIs 165 (e.g., a Representational State Transfer (REST) APIs) configured to perform actions associated with the frontend modules. The APIs may be caused to perform an action based on user interactions with the shell application 115. In some instances, the APIs may be caused to perform an action based on the user interacting with a user interface of the shell application 115. In some instances, the APIs may be caused to perform an action based on a user input provided to the AI platform component 145. The APIs 165 may be in communication with an authorization cache 170 configured to store authorization and/or authentication information associated with a particular user interacting with the system 100.

The system 100 may include a metadata registry component 175 configured to store a centralized index of metadata for available API endpoints for the APIs 165. The metadata may include paths associated with the API endpoints, methods/actions associated with the API endpoints, descriptions of the API endpoints, parameters to be provided to the API endpoints, etc.

The system 100 may include a Continuous Ingestion/Continuous Deployment (CI/CD) pipeline 180 configured to ingest files corresponding to modules to be added to the system 100. The CI/CD pipeline 180 may detect and extract metadata corresponding to the module from the file. The metadata may correspond to information associated with API endpoints for one or more APIs associated with the modules. The CI/CD pipeline 180 may be configured to validate the API endpoints and store the metadata for the validated API endpoints in the metadata registry component 175. The metadata may be used to implement the one or more APIs corresponding to the module or otherwise enable the system 100 to interact with the one or more APIs.

The CI/CD pipeline 180 may be configured to validate the API endpoints using one or more contract tests generated based on the extracted metadata. For example, the contract tests may represent expected results from interaction with the API endpoints (e.g., expected API calls, expected responses, etc.). The CI/CD pipeline 180 may be configured to generate API calls to the API endpoints according to the metadata. The result of execution of the API calls may be compared to the expected results of the contract tests to validate the API endpoints.

As described in more detail below in connection with FIG. 3, the CI/CD pipeline 180 may be configured to facilitate the automatic generation of MCP functions for interacting with APIs (e.g., API endpoints) of modules added to the system 100. The MCP functions may be usable by the AI platform component 145 for generating the action requests for causing the APIs to perform actions responsive to user inputs provided to the AI platform component 145.

The MCP functions may be generated by the MCP function generation component 185. As described in connection with FIG. 3, the metadata extracted from the file input to the CI/CD pipeline 180 may be provided to the MCP function generation component 185. The MCP function generation component 185 may be configured to generate one or more MCP functions using a generative model (e.g., an LLM or another transformer-based model) based on the metadata. The MCP function generation component 185 may be further configured to generate one or more MCP servers for implementing the MCP functions and interacting with the corresponding APIs (e.g., API endpoints of the APIs). The MCP function generation component 185 may send the MCP functions (and, if relevant, the MCP servers) to the AI platform component 145 for implementation and use.

FIG. 2 shows an example implementation of an AI platform component 145 configured in accordance with some embodiments of the present disclosure. As shown, the AI platform component 145 may include an AI agent API service 210. The AI agent API service 210 may be configured to cause components (e.g., APIs) of the system 100 to perform actions responsive to user inputs. As indicated by an arrow 205 shown in FIG. 2, the AI agent API service 210 may be configured to receive a user input from the client 110. The user input may correspond to a natural language input provided by a user (e.g., typed text input to the shell application 115 via the client 110) or otherwise derived from an input received from the user (e.g., typed text derived from a spoken input provided to the shell application 115 via the client 110). For example, the user input may correspond to a request for the system 100 to perform an action, such as "when is my next payment due?", "show me a list of my customers", "add a new customer", or the like.

As indicated by an arrow 207, the AI agent API service 210 may be configured to receive a user authentication token corresponding to a user profile associated with the user input from the access service 155. In some implementations, the user authentication token may be retrieved from the authorization cache 170 in response to receiving the user input. In some implementations, the user authentication token may be received along with the user input. The user authentication token may correspond to a unique identifier authenticating, or otherwise indicating, the identity of the user that provided the user input and indicates, or otherwise may be used to determine, system functionality that the user is authorized to access. Example system functionality may include modules/module APIs that are allowed to be accessed by the user or on the user's behalf, information that the user is authorized to access or have accessed on their behalf, etc.

The AI agent API service 210 may be configured to cause one or more components of the system 100 to perform an action responsive to the user input and/or generate a response to the user input, such as an API of the system 100. As an example, for a user input of "when is my next payment due?", the AI agent API service 210 may cause an API of the system 100 to provide the next payment information for the user, which may be presented via the client 110. For further example, the AI agent API service 210 may cause the API of the system 100 to determine the next payment information, and the AI agent API service 210 may use the information to generate a response to the user input.

The user input and/or the user authentication token may be included in a prompt requesting that the AI agent API service 210 generate a response to the user input. The prompt may include a request for the AI agent API service 210 to generate one or more action requests based on the user input and the user authentication token to cause components of the system 100 to perform actions responsive to the user input.

The AI agent API service 210 may be configured to determine (e.g., discover) APIs (e.g., API endpoints) of the system 100 that may be used to perform an action in response to the user input via interaction with the MCP service 220. The MCP service 220 may include one or more MCP servers 230*a-n*, which may implement one or more executable functions (e.g., MCP functions) for causing one or more APIs of the system 100 to perform one or more actions. Some MCP servers of the MCP servers 230*a-n* may be configured to interact with a particular API. Other MCP servers of the MCP servers 230*a-n* may be configured to interact with multiple APIs, such as APIs having related functionalities. An MCP function of an MCP server may define information (e.g., API specification information, such as a schema)) specific to generating and executing an API call to a particular API endpoint of the API to cause a particular action (e.g., a GET action, a PUT action, etc.).

As indicated by an arrow 212, the AI agent API service 210 may send a discovery request to the MCP service 220 requesting a list of MCP functions that are available to the AI agent API service 210 for performing processing with respect to the user input. For example, the list MCP functions may be used by the AI agent API service to generate an action to be performed in response to the user input. The MCP service 220 may determine, from amongst the MCP functions of the MCP servers 230*a-n*, a subset of MCP functions available to the AI agent API service 210.

MCP service 220 and/or the MCP server 230*a-n* may be configured to implement authentication and/or authorization rules to limit MCP functions made available to the AI agent API service 210, for performing processing with respect to a user input, to the MCP functions that correspond to system functionality that is authorized for access by the current user. In some implementations, that MCP service 220 and/or the MCP server 230*a-n* may be configured to implement Role-Based Control Access (RBAC) techniques to perform the authentication and/or authorization. Whether the current user is authorized to access a particular API or API endpoint may be indicated by, or determined based on, the user authentication token, which may be included in the discovery request and used by the MCP service 220 to determine which MCP functions are authorized for user and, therefore, should be made available to the AI agent API service 210.

As indicated by an arrow 214, the MCP service 220 may send, based on the discovery request, a list of available MCP functions to the AI agent API service 210. In addition to indicating the available MCP functions, the list may include information associated with the available MCP functions. For example, the list of MCP functions may include a particular MCP function available to the AI agent API service 210 and API specification information (e.g. a schema) associated with the API endpoint associated with the MCP function. The API specification information may include, for example, a path associated with the API endpoint (e.g., "/api/customers"), a method or action associated with the API endpoint (e.g., GET, POST, etc.), and/or a description of the method or action associated with the API endpoint (e.g., list customers, create customer, retrieve payment information, etc.).

Based on the list of MCP functions, the AI agent API service 210 may be configured to generate a request (e.g., an action request) for performance of an action using the API endpoint in response to the user input. For example, the AI agent API service 210 may select a particular MCP function most relevant to the user input and generate an API call, a directive, a command, etc., based on the API specification information associated with the MCP function. In some implementations, the AI agent API service 210 may determine a relevancy of an MCP function based on a semantic similarity of the description associated with the MCP function and the user input.

The AI agent API service 210 may be configured to process each of the MCP functions provided by the MCP service 220 to determine a relevance of the MPC function to the user input. The MPC function determined to be most relevant to the user input may be used to generate the action request. For example, for a user input of "when is my next payment information?", the AI agent API service 210 may determine that an MCP function associated with an API endpoint for retrieving payment information is more relevant to the user input than an MCP function associated with an API endpoint for retrieving a customer list. The action request may include the user authentication token.

As indicated by an arrow 216, the AI agent API service 210 may send the action request to the MCP service 220. In particular, the action request may be provided to the MCP server that implements the MCP function selected by the AI agent API service 210.

As indicated by an arrow 218, the MCP function may execute an API call to the corresponding API (e.g., the corresponding API endpoint of the API) of the APIs 165 based on the action request. For example, in implementations where the AI agent API service 210 is configured to generate an API call based on the MCP function, the MCP server 230*a-n* may execute the API call to the API of the APIs 165. As another example, in implementations where the AI agent API service 210 is configured to generate a directive or command, other than an executable API call, based on the MCP function, the MCP server 230*a-n* may generate and execute a corresponding API call to the API to perform the requested action. The API call may request that the API perform a particular action. The API call may indicate that the action is to be performed in accordance with the user authentication token.

Based on receiving the API call from the MCP server 230*a-n*, the API may cause performance of the requested action. The API may send a request to a corresponding application to perform the action (e.g., provide information, store information, generate information, etc.). The action performed by the API may be an action authorized for the user, as indicated by, or determined based on, the user authentication token. For example, if the API corresponds to a request for a customer list, the API may only retrieve a customer list that the user is authorized to access (e.g., a list of the user's customers), as indicated by, or determined based on, the user authentication token. As another example, if the API corresponds to a request for information about a next payment, the API may retrieve next payment information authorized for access by the user), as indicated by, or determined based on, the user authentication token.

In some implementations, as indicated by an arrow 222, in response to causing performance of the action, the API may send an API response to the MCP server 230*a-n*. The API response may indicate performance of the action, such as that the action was performed successfully, whether an error occurred, etc. In some instances, the API response may include additional information associated with performance of the action, such as information requested by the API call. For example, if the API included a request for information about a next payment, the API response may include the next payment information for the user. For further example, if the API call included a request for a customer list for the user, the API response may include a list of the user's customers.

As indicated by an arrow 224, the API response (or information determined based on or extracted from the API response) may be sent to the AI agent API service 210. The API response may be used by the AI agent API service 210 for further processing with respect to the user input. For example, based on receiving the API response, the AI agent API service 210 may determine that processing with respect to the user input is complete. For further example, based on receiving the API response, the AI agent API service 210 may determine whether any additional actions are to be performed in response to the user input. In some such instances, the processing described herein with respect to the arrows 212, 214, 216, 218, 222, and 224 may be performed with respect to the additional actions.

The AI agent API service 210 may additionally use the API response to generate a response to the user input. For example, the AI agent API service 210 may use the API response to generate a response indicating an action request by the user input was performed (e.g., "Your contact information has been updated", "Customer has been successfully added", or the like). For further example, the AI agent API service 210 may use the additional information included in the API response to generate a response (e.g., "Here is your next payment information: [next payment information]", "Here is the customer list: [list of customers]", or the like). The response may be sent to the client 110, where it may be presented to the user via a user interface (e.g., of the shell application 115).

As indicated by an arrow 226, the response may be sent to the client 110 for presentation to the user (e.g., via the shell application 115).

In some implementations, the AI agent API service 210 may be configured to interact with the external MCP service 240 to determine APIs that may be used in response to the user input. Similar to the MCP service 220, the external MCP service 240 may include one or more MCP servers implementing one or more MCP functions, but the external MCP service 240 may be associated with third-party APIs/applications. As indicated by an arrow 217, the AI agent API service 210 may interact with the external MCP service 240 in a similar manner as with the MCP service 220. For example, the AI agent API service 210 may send a discovery request to the external MCP service 240 requesting MCP functions that are available to the AI agent API service 210 for generating a response to the user input. Based on a list of MCP functions received from the external MCP service 240, the AI agent API service 210 may generate an action request corresponding to an MCP function of the external MCP service 240, which may be executed by a corresponding MCP server. The AI agent API service 210 may receive an API response from the external MCP service 240 resulting from performance of the requested action.

In some implementations, the MCP server 230*a-n* and/or the corresponding MCP functions may be manually generated and/or implemented into the system 100, such as by a developer. In some implementations, one or more of the MCP server 230*a-n* and/or one or more of the corresponding MCP functions of one or more of the MCP server 230*a-n* may be automatically generated by the system 100 (e.g., by the MCP function generation model 340), as described below in connection with FIG. 3.

FIG. 3 shows an example implementation of an MCP function generation component 185 configured in accordance with some embodiments of the present disclosure. As described above in connection with FIG. 1, the CI/CD pipeline 180 may be configured to identify and register additional API functionality with the system 100. As indicated by an arrow 305 in FIG. 3, the CI/CD pipeline 180 may receive an input file associated with API functionality to be added to the system. The CI/CD pipeline 180 may be configured to extract API specification metadata corresponding to API functionality from the input file. For example, the CI/CD pipeline 180 may be configured to parse the input file for particular keywords corresponding to API specification metadata and extract the information accordingly.

As noted above, the API specification metadata may include information associated with a new API and/or information associated with one or more API endpoints of the new API or an existing API. The information associated with the API endpoints may include paths corresponding to the API endpoints, methods/actions corresponding to the API endpoints (e.g., GET, PUT, etc.), natural language descriptions corresponding to the API endpoints (e.g., get customer list, create customer, get payment information, etc.), parameters acceptable or expected by the API endpoints (e.g., as included in API calls to the API endpoints). As indicated by an arrow 310, the API specification metadata may be sent to the metadata registry component 175, where it may be registered for use by the system 100.

In some implementations, prior to sending the API specification metadata to the metadata registry component 175, the CI/CD pipeline 180 may be configured to test the validity of the API endpoints indicated by the API specification metadata. For example, the CI/CD pipeline 180 may be configured to perform contract testing of the API endpoints based on the API specification metadata. The CI/CD pipeline 180 may generate contract tests from the API specification metadata. A contract test may represent an expected result of execution of an API call to a particular API endpoint according to the API specification metadata. The contract test may be satisfied, and the API specification metadata and API endpoint determined to be valid, if the result of execution the API call matches the expected result, as indicated by the API specification metadata. API specification metadata for API endpoints determined to be valid may be sent to the metadata registry component 175.

In some implementations, the CI/CD pipeline 180 may be further configured to facilitate the automatic generation of MCP functions corresponding to the API functionality. As indicated by an arrow 315, the API specification metadata extracted from the input file may be sent to the embedding model 320. The embedding model 320 may be configured to convert the API specification metadata into an embedding to be processed by the MCP function generation model 340. The embedding model 320 may correspond to a generative model (e.g., a transformer-based model (e.g., an encoder)) configured to convert inputs (e.g., the API specification metadata) to a numerical vector representation (e.g., an embedding) for input to the MCP function generation model 340. As indicated by an arrow 325, the metadata embedding may be sent to a vector database 330 for storage.

As indicated by arrows 327 and 329, the metadata embedding may be sent to the MCP function generation model 340. For example, as indicated by the arrow 329, the metadata embedding may be retrieved from the vector database 330 for processing by the MCP function generation model 340. For further example, as indicated by the arrow 327, the metadata embedding may be sent directly from the embedding model 320 to the MCP function generation model 340.

The MCP function generation model 340 may correspond to a generative model (e.g., an LLM or other transformer-based model) configured to generate MCP functions based on the metadata embedding. For example, given a metadata embedding, representing API specification information for API functionality to be added to the system 100, the MCP function generation model 340 may generate an MCP function associated with the API functionality. In some implementations, the MCP function generation model 340 may correspond to the generative model of the AI agent API service 210. The generated MCP function may correspond to software code, or structured information usable by an MCP server, for interacting with the corresponding API and causing performance of the corresponding API functionality. The MCP function may be configured to execute an API call to the corresponding API endpoint to perform the action. In some implementations, the MCP function may include, or otherwise be associated with the API specification information corresponding to the API endpoint. In some implementations, the API specification information may be provided to the AI agent API service 210 for generating an action request.

In some implementations, the MCP function generation model 340 may be configured to generate multiple MCP functions using the metadata embedding. For example, in some instances, the API specification metadata may include information associated with multiple API endpoints of an API. In some implementations, the MCP function generation model 340 may be configured to generate an MCP function for each of the API endpoints. In some implementations, a generated MCP function may correspond to more than one API endpoint. As indicated by an arrow 345, the generated MCP functions may be sent to an MCP function testing component 350.

In some implementations, the MCP function generation model 340 may be configured to generate an MCP server configured to implement the generated MCP functions. For example, if the metadata embedding indicates that the corresponding API specification is adding API functionality for a new API to the system 100, then the MCP function generation model 340 may generate (software code for) a new MCP server to implement the corresponding generated MCP functions. The MCP function generation model 270 may be configured to register the generated MCP functions with the new MCP server. If, instead, the metadata embedding indicates that the corresponding API specification is adding API functionality for an API already accessible to the system 100, then the MCP function generation model 340 may generate the MCP functions to be added to (e.g., registered with) the corresponding MCP server 230*a-n*. The MCP function generation model 340 may send the MCP functions to the MCP service 220 for registering with the corresponding MCP server 230*a-n*. In some implementations, the MCP function generation model 340 may be configured to update the existing (or generate a new) MCP server to further implement the newly generated MCP functions.

In some implementations, the MCP function generation model 340 may be configured to generate the MCP server to implement authentication and/or authorization rules for interacting with the AI agent API service 210, such as those described above. For example, an MCP server generated by the MCP function generation model 340 may be configured to only make discoverable MCP functions that are determined to be authorized for access by a current user using a user authentication token for the user profile. As described above, the MCP server make be configured to implement RBAC techniques to enforce the authentication and/or authorization rules.

The MCP function testing component 350 may be configured to test a validity of the MCP functions generated by the MCP function generation model 340. For example, the MCP function testing component 350 may be configured to perform contract testing of the MCP functions based on the corresponding API specification metadata. For instance, the MCP function testing component 350 may generate a contract test based on API specification metadata for a first API endpoint in order to test the validity of an MCP function generated for the first API endpoint. In some implementations, the MCP function testing component 350 may use the contract tests used by the CI/CD pipeline 180 to validate the API endpoints. If the result of execution of an API call using a generated MCP function matches the expected result represented by the contract test, the MCP function may be determined to be valid. Otherwise, the MCP function may be sent back to the MCP function generation model 340 for re-generation. In some implementations, an invalid MCP function sent back to the MCP function generation model 340 may be sent along with an indication that the MCP function is invalid and why the MCP function was determined to be invalid.

As indicated by an arrow 355, generated MCP functions determined to be valid may be sent to the MCP service 220. The MCP functions may be implemented by corresponding MCP servers 230*a-n*. In instances where one or more MCP servers are generated by the MCP function generation model 340, the MCP servers may be further sent with the generated MCP functions to the MCP service 220 for implementation. The implemented MCP functions may be utilized by the AI agent API service 210 for causing performance of actions in response to user inputs, as described herein.

Figure 4:
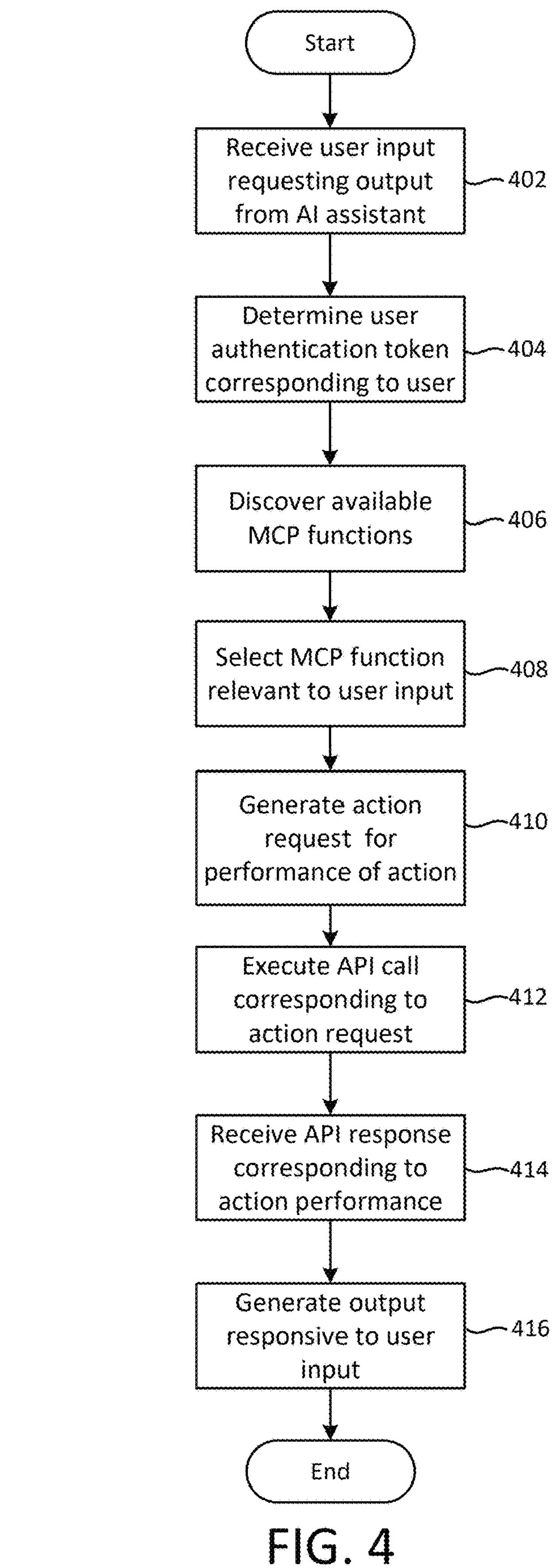
FIG. 4 shows an example process that may be performed by the AI platform shown in FIGS. 1 and 2 to cause a component of the system to perform an action responsive to a user input.

FIG. 4 shows an example process 400 that may be performed by the AI platform component 145 (shown in FIGS. 1 and 2) to cause a component of the system 100 to perform an action responsive to a user input. As shown, the process 400 may begin at a step 402, at which an AI agent API service 210 (shown in FIG. 2) of the AI platform component 145 may receive a user input including a user request. For example, as noted above, the user input may correspond to a request for performance of an action (e.g., "when is my next payment due?", "what kind of medical coverage do I have", etc.).

At a step 404 of the process 400, the AI agent API service 210 may receive a user authentication token associated with the user input. For example, as noted above, the user authentication token may correspond to a unique identifier and may identify the user that provided the user input and indicate functionality of the system 100 that is accessible to the user.

At a step 406 of the process 400, the AI agent API service 210 may discover available MCP functions. For example, as noted above, the AI agent API service 210 may send a discovery request to the MCP service 220 requesting that the MCP service 220 indicate MCP functions that are available to the AI agent API service 210 for generating a response to the user input. As noted above, the discovery request may include the user authentication token, and the MCP functions discoverable by the AI agent API service 210 may be limited to MCP functions that the user is authorized to access, as indicated by the user authentication token. Based on the discovery request, the AI agent API service 210 may receive a list of MCP functions available to the AI agent API service 210.

At a step 408 of the process 400, the AI agent API service 210 may select an MCP function, from the list of available MCP functions, that is relevant to the user input. For example, as noted above, the list of MCP functions may include API specification information corresponding to APIs (e.g., API endpoints) associated with the MCP functions. The AI agent API service 210 may select an MCP function based on the API specification information indicating that the MCP function is relevant to the user input.

At a step 410 of the process 400, the AI agent API service 210 may generate an action request for performance of an action. For example, as noted above, the action request may correspond to an API call, a directive, or a command, for an API to perform an action determined by the AI agent API service 210. The AI agent API service 210 may generate the action request according to the API specification information associated with the selected MCP function. The action request may include the user authentication token.

At a step 412 of the process 400, an MCP server 230*a-n* of the AI platform component 145 may execute an API call corresponding to the action request. As noted above, the MCP server 230*a-n* may be configured to generate an API call corresponding to the action request. The API call may request that a corresponding API perform an action. The API call may indicate that the action is to be performed in accordance with the user authentication token.

At a step 414 of the process 400, the AI platform component 145 may receive an API response corresponding to performance of the requested action. For example, as noted above, the MCP server 230*a-n*/the MCP service 220 may receive the API response as a result of the API performing the requested action. The API response may indicate whether the action was performed successfully, whether an error occurred, etc., and, in some instances, additional information requested as part of the API call.

At a step 416 of the process 400, the AI agent API service 210 may generate an output responsive to the user input. For example, as noted above, the MCP server 230*a-n*/the MCP service 220 may send the API response (or information determined based on, or extracted from, the API response) to the AI agent API service 210. The AI agent API service 210 may use the API response to generate a response to the user input. As noted above, the response may be output to the user. For example, the response may be sent to the client 110, where it may be presented to the user via a user interface (e.g., of the shell application 115).

Figures 5, 6:
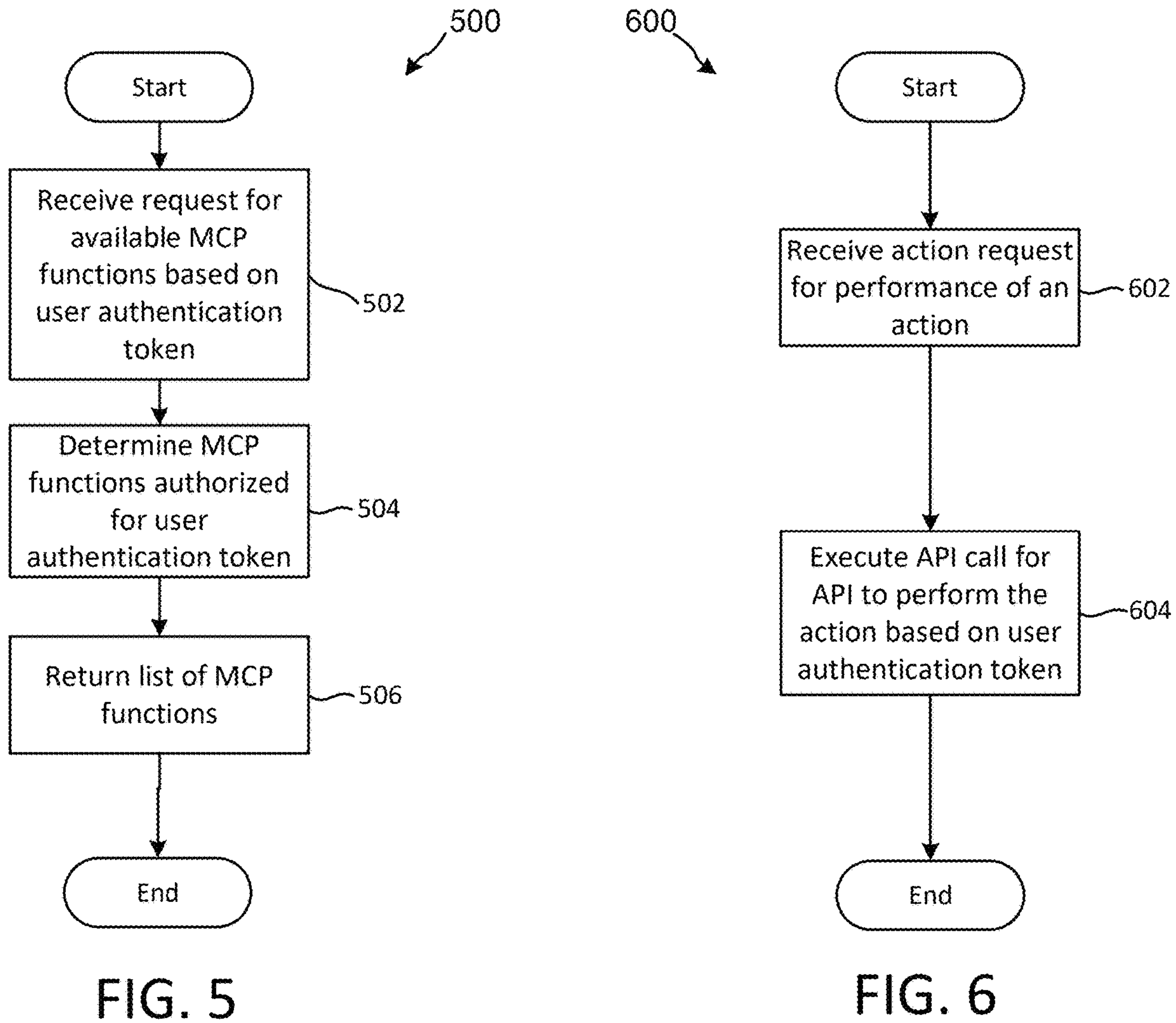
FIG. 5 shows an example process that may be performed by the MCP service shown in FIG. 2 to use a user authentication token to determine a list of MCP functions available to the AI agent API service.
FIG. 6 shows an example process that may be performed by an MCP server shown in FIG. 2 to execute an application programming interface (API) call to cause an API to perform an action based on an action request received from the AI agent API service.

FIG. 5 shows an example process 500 that may be performed by the MCP service 220 (shown in FIG. 2) to use a user authentication token to determine a list of MCP functions available to the AI agent API service 210 (shown in FIG. 2). FIG. 6 shows an example process 600 that may be performed by an MCP server 230*a-n* (shown in FIG. 2) of the MCP service 220 to execute an API call to cause an API to perform an action based on an action request received from the AI agent API service 210.

The example process 500 (shown in FIG. 5), which may be performed by the MCP service 220 in accordance with some implementations of the present disclosure, will now be described. As shown, the process 500 may begin at a step 502, at which the MCP service 220 may receive a request for available MCP functions. For example, as noted above, the AI agent API service 210 may generate and send a discovery request to the MCP service 220 requesting MCP functions that are available to the AI agent API service 210 for generating a response to a user input. The discovery request may include a user authentication token corresponding to a user profile associated with the user input. As noted above, the user authentication token may identify the user and indicate system functionality authorized for access by the user.

At a step 504 of the process 500, the MCP service 220 may determine MCP functions authorized for the user authentication token. For example, as noted above, the MCP service 220 may use the user authentication token to determine a list of MCP functions that are authorized for access by the user and, therefore, available to the AI agent API service 210 to generate a response to the user input.

At a step 506 of the process 500, the MCP service 220 may return the list of MCP functions.

The example process 600 (shown in FIG. 6), which may be performed by an MCP server 230*a-n* of the MCP service 220 in accordance with some implementations of the present disclosure, will now be described. As shown, the process 600 may begin at a step 602, at which the MCP service 220 may receive an action request for performance of an action. For example, as noted above, the action request may be generated by the AI agent API service 210 based on the list of available MCP functions. The action request may correspond to a particular MCP function that is to cause performance of the action (e.g., by a corresponding API). The action request may be provided to an MCP server 230*a-n* that implements the MCP function.

At a step 604 of the process 500, an MCP server 230*a-n* of the MCP service 220 may execute an API call for an API to perform the action based on the user authentication token. For example, as noted above, the action request may include the user authentication token corresponding to the user profile associated with the user input. In some implementations, the MCP server 230*a-n* may execute the API call by executing the action request. In some implementations, the MCP server 230*a-n* may use the action request to generate the API call. The API call may request that the corresponding API perform the action requested by the action request in accordance with the user authentication token. For example, the API call may indicate that the API is to only perform processing to perform the action that is authorized for the user.

Figure 7:
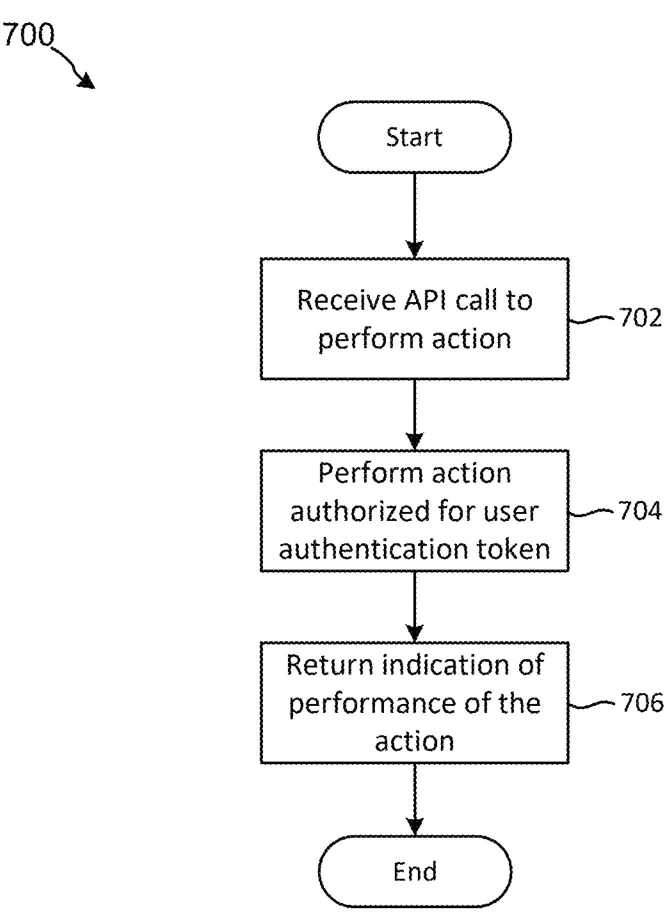
FIG. 7 shows an example process that may be performed by one of the APIs shown in FIGS. 1 and 2 to perform an action in response to an API call.

FIG. 7 shows an example process 700 that may be performed by an API of the APIs 165 (shown in FIGS. 1 and 2) to perform an action in response to an API call. As shown, the process 700 may begin at a step 702, at which the API may receive an API call to perform an action. For example, as noted above, the MCP server 230*a-n* may execute an API call based on an action request received from the AI agent API service 210. The API call may request that the API perform an action determined by the AI agent API service 210 based on the user input. The API call may include a user authentication token corresponding to the user profile associated with the user input. The API call may indicate that the processing performed by the API to perform the action must be done in accordance with the user token.

At a step 704 of the process 700, the API may perform an action authorized for a user authentication token. For example, as noted above, the API may perform the action requested by the API call. The processing performed by the API to perform the action may be processing that authorized for the user, as indicated by the user authentication token. For example, for an action of "retrieve customer list", the API may retrieve a customer list that is authorized for access by the user, as indicated by the user authentication token (e.g., a customer list of the user's customers).

At a step 706 of the process 700, the API may return an indication of performance of the action. For example, as noted above, the API may send an API response to the MCP server 230*a-n* that executed the API call to the API. The API response may indicate the action performed, whether an error occurred, etc., and, in some instances, additional information associated with performance of the action (e.g., requested information).

Figure 8:
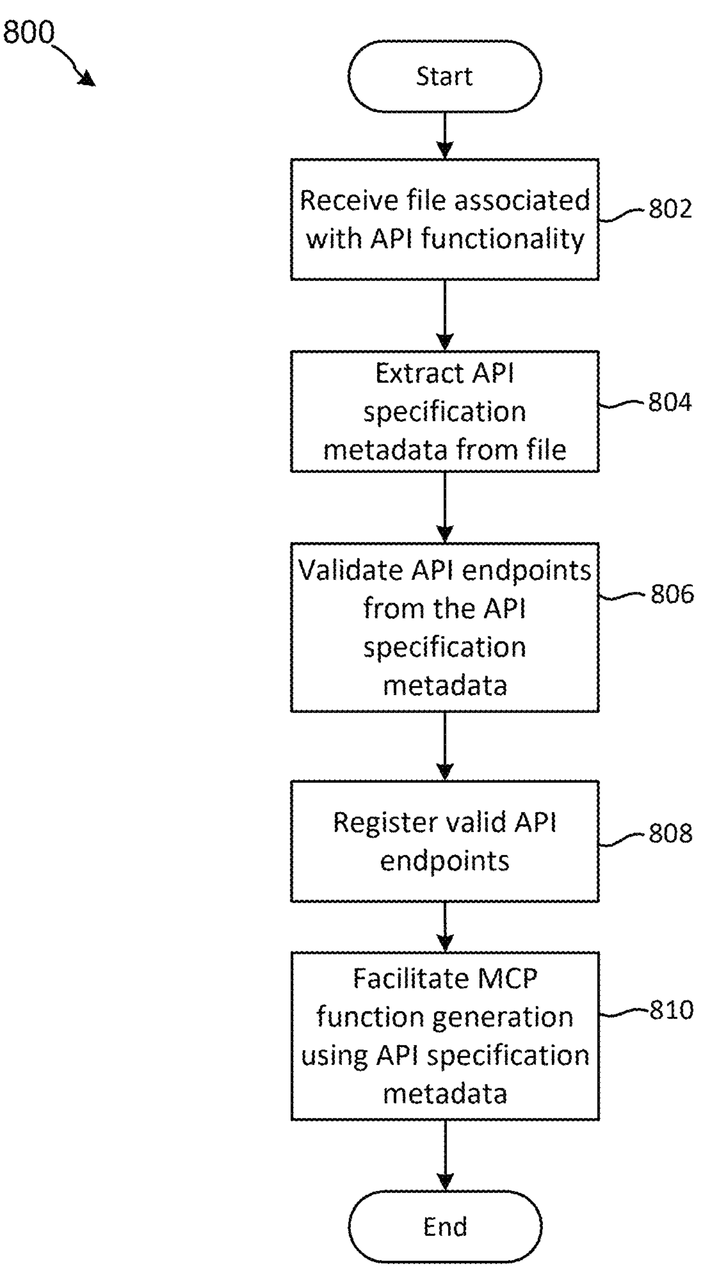
FIG. 8 shows an example process that may be performed by the CI/CD pipeline shown in FIGS. 1 and 3 to determine metadata corresponding to additional API functionality to be added to the system and facilitate MCP function generation.

FIG. 8 shows an example process 800 that may be performed by the CI/CD pipeline 180 (shown in FIGS. 1 and 3) to determine metadata corresponding to additional API functionality to be added to the system 100 and facilitate MCP function generation. As shown, the process 800 may begin at a step 802, at which the CI/CD pipeline 180 may receive a file associated with API functionality. For example, as noted above, the additional API functionality may correspond to a new API (and API endpoints) to be added to the system 100 or new API endpoints to be added to an existing API.

At a step 804 of the process 800, the CI/CD pipeline 180 may extract API specification metadata from the file. For example, as noted above, the file may include metadata associated with the API functionality to be added to the system. The metadata may correspond to API specification information corresponding to the API functionality (e.g., an API to be added, and/or API endpoints of an API, including paths, methods, and descriptions, parameters, etc.).

At a step 806 of the process 800, the CI/CD pipeline 180 may validate API endpoints from the API specification metadata. For example, as noted above, the CI/CD pipeline 180 may validate the API endpoints detailed in the API specification metadata against a corresponding MCP server 230*a-n* of the system. The CI/CD pipeline 180 may perform contract testing using the corresponding MCP server 230*a-n* to determine whether the API endpoints are valid (e.g., whether executing an API call to the API endpoint based on the API specification information results in an error).

At a step 808 of the process 800, the CI/CD pipeline 180 may register valid API endpoints with the system 100. For example, as noted above, API specification metadata corresponding to the valid API endpoints may be registered with the metadata registry component 175.

At a step 810 of the process 800, the CI/CD pipeline 180 may facilitate MCP function generation using the API specification metadata. For example, as noted above, the API specification metadata may be sent to the MCP function generation component 185 for processing.

Figure 9:
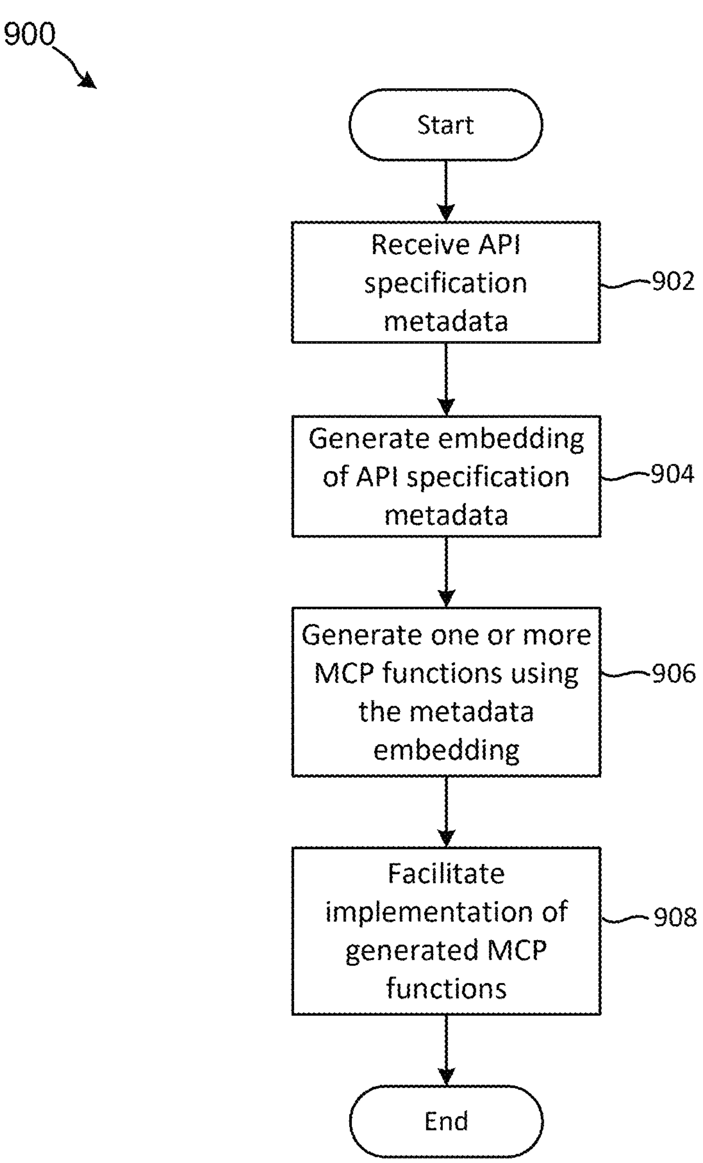
FIG. 9 shows an example process that may be performed by the MCP function generation component shown in FIGS. 1 and 3 to generate MCP functions corresponding to additional API functionality to be added to the system.

FIG. 9 shows an example process 900 that may be performed by the MCP function generation component 185 (shown in FIGS. 1 and 3) to generate MCP functions corresponding to additional API functionality to be added to the system 100. As shown, the process 900 may begin at a step 902, at which an embedding model 320 of the MCP function generation component may receive API specification metadata. For example, as noted above, the API specification metadata may be extracted from a file received by the CI/CD pipeline 180.

At a step 904 of the process 900, the embedding model 320 may generate an embedding of the API specification metadata. For example, as noted above, the embedding model 320 may correspond to a generative model (e.g., an encoder) configured to generate an embedding representation of the API specification metadata for input to the MCP function generation model 340.

At a step 906 of the process 900, an MCP function generation model 340 of the MCP function generation component 185 may generate one or more MCP functions using the metadata embedding. For example, as described herein, the MCP function generation model 340 may correspond to a generative model (e.g., an LLM or any other transformer-based model) configured to generate (software code corresponding to) an MCP function. The MCP function generation model 340 may generate an MCP function for each API endpoint represented in the metadata embedding. The MCP function may include, or otherwise indicate, the API specification information associated with the corresponding API endpoint. In some implementations, the MCP function generation model 340 may generate (software code corresponding to) an MCP server for implementing one or more of the MCP functions.

At a step 908 of the process 900, the MCP function generation model 340/the MCP function generation component 185 may facilitate implementation of the generated MCP functions. For example, as noted above, the generated MCP functions (e.g., the software corresponding to the generated MCP functions) and, if relevant, generated MCP servers, may be sent to the MCP service 220 for implementation and use by the AI agent API service 210.

Figure 10:
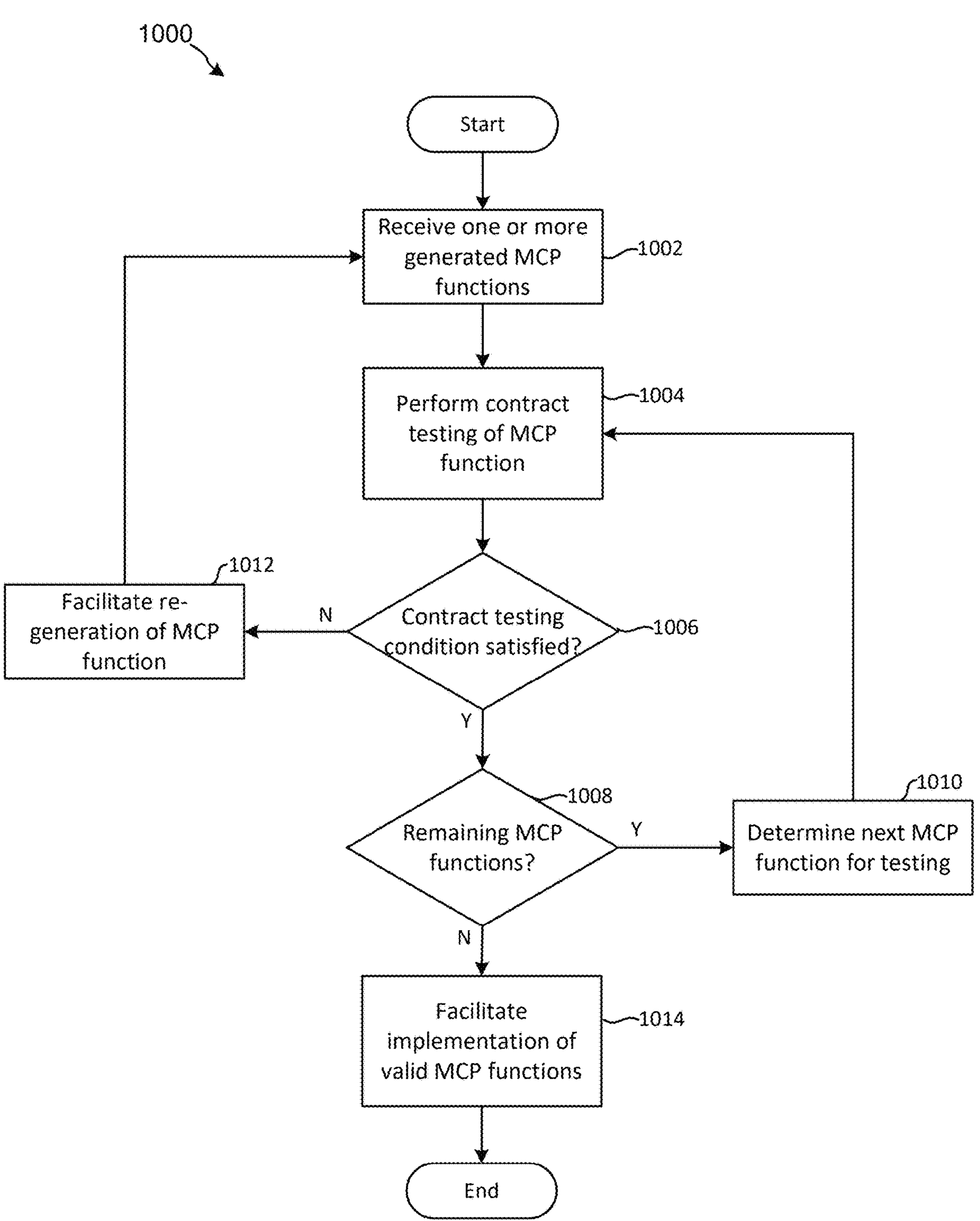
FIG. 10 shows an example process that may be performed by the MCP function testing component shown in FIG. 3 to test MCP functions generated by the MCP function generation model.

FIG. 10 shows an example process 1000 that may be performed by the MCP function testing component 350 (shown in FIG. 3) to test MCP functions generated by the MCP function generation model 340. As shown, the process 1000 may begin at a step 1002, at which the MCP function testing component 350 may receive one or more generated MCP functions.

At a step 1004 of the process 1000, the MCP function testing component 350 may perform contract testing of an MCP function. For example, as noted above, the MCP function testing component 350 may determine whether the MCP function adheres to the API specification metadata for the corresponding API endpoint, which was used to generate the MCP function. The MCP function testing component 350 may generate contract tests based on the API specification metadata received by the MCP function generation component 185. In some embodiments, the MCP function testing component 350 may use the contract tests used by the CI/CD pipeline 180. The MCP function testing component 350 may use the contract tests to test the validity of the MCP functions.

At a step 1006 of the process 1000, the MCP function testing component 350 may determine whether a contract testing condition is satisfied. For example, the MCP function testing component 350 may execute the contract tests using the MCP functions to determine whether the result of executing API calls using the MCP function corresponds to an expected result, as defined by the contract tests.

In instances where the MCP function testing component 350 determines, at the step 1006, that the contract testing condition is not satisfied, the process 1000 may proceed to a step 1012, at which the MCP function testing component 350 may facilitate re-generation of the MCP function. For example, as noted above, the MCP function testing component 350 may send the MCP function back to the MCP function generation model 340 along with an indication that the MCP function fails the contract test and is to be re-generated. The process 1000 may then return to the step 1002.

In instances where the MCP function testing component 350 determines, at the step 1006, that the contract testing condition is satisfied, the process 1000 may proceed to a step 1008, at which the MCP function testing component 350 may determine whether there are any remaining generated MCP functions to be tested. In instances where the MCP function testing component 350 determines, at the step 1008, that there are remaining generated MCP functions to be tested, the process may proceed to a step 1010, at which the MCP function testing component 350 may determine a next MCP function to be tested. The process 1000 may then return to the step 1004.

In instances where the MCP function testing component 350 determines, at the step 1008, that there are no remaining generated MCP functions to be tested, the process 1000 may proceed to a step 1014, at which the MCP function testing component 350 may facilitate implementation of the valid MCP functions. For example, as noted above, the MCP function testing component 350 may send the MCP functions to the MCP service 220 for implementation.

Figure 11:
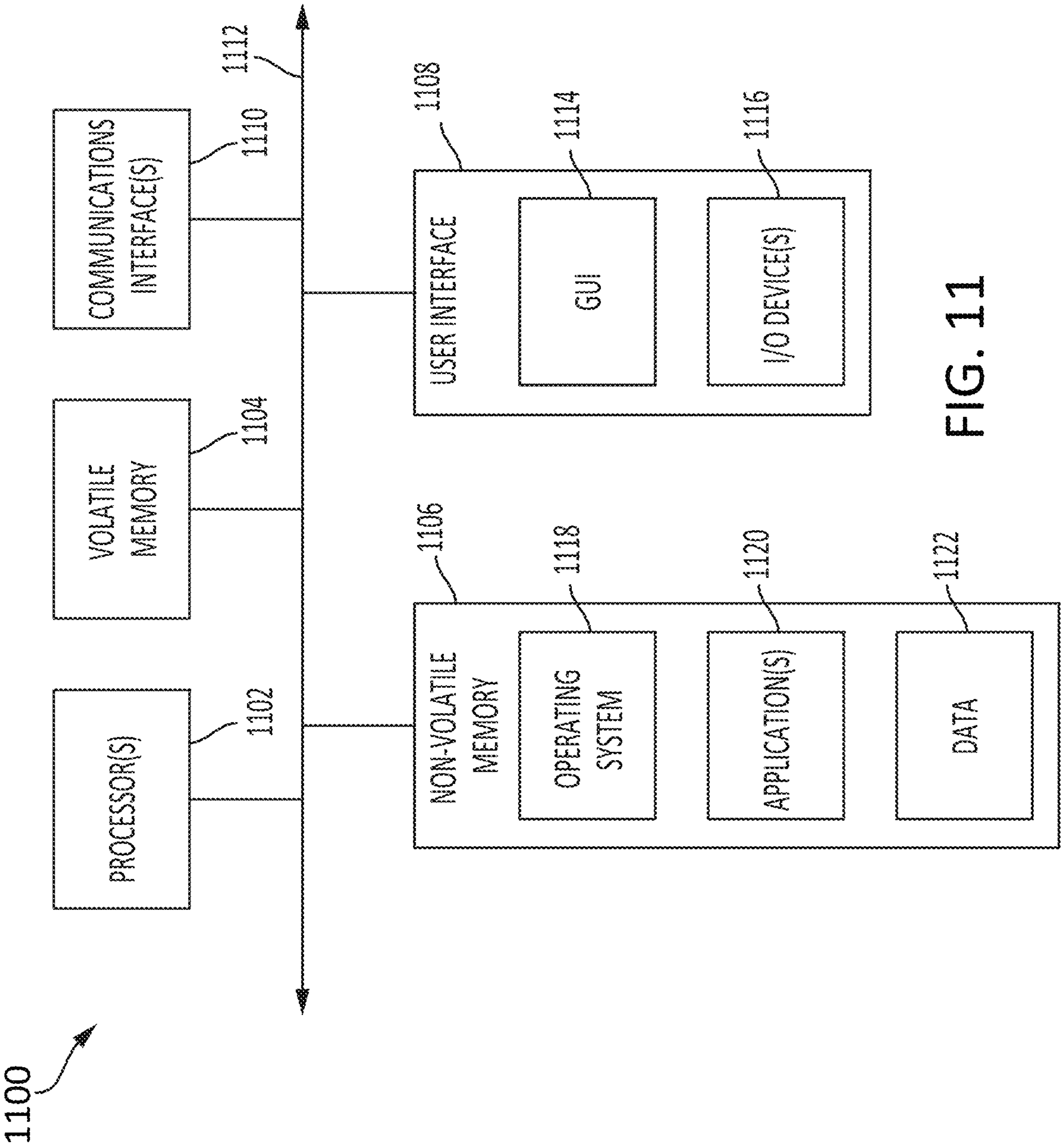
FIG. 11 illustrates an example of a computing system that may be used to implement one or more of the respective components of the system shown in FIG. 1.

FIG. 11 illustrates an example computing system 1100 that may be used to implement one or more of the respective components (e.g., the client 110, the shell application 115, the gateway component 140, the AI platform component 145, the access service 155, the APIs 165, the authorization cache 170, the metadata registry component 175, the MCP function generation component 185, the CI/CD pipeline 180, etc.) within the system 100 shown in FIG. 1. As shown in FIG. 11, the computing system 1100 may include one or more processors 1102, volatile memory 1104 (e.g., RAM), non-volatile memory 1106 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 1108, one or more communications interfaces 1110, and a communication bus 1112. The user interface 1108 may include a graphical user interface (GUI) 1114 (e.g., a touchscreen, a display, etc.) and one or more input/output (I/O) devices 1116 (e.g., a mouse, a keyboard, etc.). The non-volatile memory 1106 may store an operating system 1118, one or more applications 1120, and data 1122 such that, for example, computer instructions of the operating system 1118 and/or applications 1120 are executed by the processor(s) 1102 out of the volatile memory 1104. Data may be entered using an input device of the GUI 1114 or received from I/O device(s) 1116. Various elements of the computing system 1100 may communicate via the communication bus 1112. The computing system 1100 as shown in FIG. 11 is shown merely as an example, as the various components of the system 100 may be implemented by any computing or processing environment and with any type of machine or set of machines that may have suitable hardware and/or software capable of operating as described herein.

The processor(s) 1102 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 1110 may include one or more interfaces to enable the computing system 1100 to access a computer network such as a Local Area Network (LAN), a Wide Area Network (WAN), a Personal Area Network (PAN), or the Internet through a variety of wired and/or wireless connections, including cellular connections.

The following clauses describe example implementations of the present disclosure.

Clause 1. A computer-implemented method comprising: receiving, by a computing system and from a client device, a user input; determining, by the computing system, a user authentication token corresponding to a user profile associated with the user input; generating, by a generative model of the computing system, an API call for a first API to perform an action responsive to the user input, the API call including the user authentication token; executing, by the computing system, the API call to cause the first API to perform the action in accordance with the user authentication token; based on executing the API call, receiving, by the computing system, API response data corresponding to performance of the action by the first API; based on the API response data and the user input, generating, by the generative model, model output data corresponding to a response to the user input; and causing, by the computing system, an interface of the client device to present output data corresponding to the model output data.

Clause 2. The computer-implemented method of clause 1, further comprising: determining, by the computing system, based on the user authentication token, for each executable function of a set of executable functions configured to interact with one or more APIs, whether the user profile is authorized to access the API; including an executable function in a subset of executable functions when it is determined, based on the user authentication token, that the user profile is authorized to access the API; and based on user input, the user authentication token, and a first executable function of the subset of executable functions, generating, by the generative model, the API call.

Clause 3. The computer-implemented method of clause 2 wherein the subset of executable functions are associated with API specification information associated with a subset of APIs that the subset of executable functions are configured to interact with, the method further comprising: based on the user input, the user authentication token, and first API specification information associated with the first executable function, generating, using the generative model, the API call.

Clause 4. The computer-implemented method of clause 2 or clause 3, wherein each executable function of the set of executable functions is associated with a description of actions associated with the executable functions, further comprising: determining, by the generative model, for each executable function of the subset of executable functions, a relevance of the executable function to the user input based on a description of the action associated with the executable function; and based on the relevance of the subset of executable functions to the user input, generating, by the generative model, the API call using the user input, the user authentication token, and the first executable function of the subset of executable functions.

Clause 5. A computer-implemented method comprising: receiving, by a computing system, file data corresponding to an API specification for an API; extracting, by the computing system, metadata associated with API specification from the file data, the metadata associated with an API endpoint of the API; based on the metadata, generating, by a first generative model of the computing system, an executable function associated with the API endpoint, wherein the executable function is configured for use by a second generative model to generate an API call to the API endpoint; and implementing, by the computing system, the executable function.

Clause 6. The computer-implemented method of clause 5, wherein generating the executable function comprises: generating, by an embedding model of the computing system, embedding data corresponding to the metadata; and using the embedding data, generating, by the first generative model, the executable function.

Clause 7. The computer-implemented method of clause 5 or 6, wherein: the metadata associated with the API specification indicates a schema for interacting with the API endpoint; and the executable function is generated based on the schema.

Clause 8. The computer-implemented method of any of clauses 5-7, further comprising: extracting, by the computing system, the metadata associated with the API specification from the file data, the metadata associated with a first API endpoint and a second API endpoint of the API; based on the metadata, generating, by the first generative model, a first executable function associated with the first API endpoint, wherein the first executable function is configured for use by the second generative model to generate an API call to the first API endpoint; based on the metadata, generating, by the first generative model, a second executable function associated with the second API endpoint, wherein the second executable function is configured for use by the second generative model to generate an API call to the second API endpoint; and implementing the first executable function and the second executable function on the computing system.

Clause 9. The computer-implemented method of any of clauses 5-8, further comprising: implementing, by a component of the computing system, the executable function, wherein the component is configured to execute the API call to the API endpoint.

Clause 10. The computer-implemented method of clause 9, further comprising: based on the metadata, generating, by the first generative model, the component.

Clause 11. The computer-implemented method of clause 9 or clause 10, wherein the component implements a set of executable functions including the executable function; and the component is configured to identify, from the set of executable functions, a subset of executable functions authorized for access by the second generative model based on a user authentication token.

Clause 12. The computer-implemented method of any of clauses 9-11, further comprising: based on the metadata, determining a contract test corresponding to an expected result of an API call to the API endpoint to perform a first action; based on the executable function, determining a first API call to the API endpoint to perform the first action; executing the first API call; determining an API response associated with execution of the first API call; based on the contract test and the API response, determining the executable function is valid; and based on determining the executable function is valid, implementing, by the computing system, the component.

Clause 13. The computer-implemented method of any of clauses 5-12, wherein the executable function corresponds to a first executable function, and the method further comprises: receiving, by the computing system and from a client device, a user input; determining a user authentication token corresponding to a user profile associated with the user input; based on the user authentication token, determining, from a set of executable functions, a subset of executable functions configured to interact with one or more APIs, the subset of executable functions including the first executable function; based on user input, the user authentication token, and the first executable function, generating, by the second generative model, a first API call for the API to perform an action responsive to the user input, the first API call including the user authentication token; executing the first API call to cause the API to perform the action in accordance with the user authentication token; based on executing the first API call, receiving API response data corresponding to performance of the action by the API; based on the API response data and the user input, generating, by the second generative model, model output data corresponding to a response to the user input; and causing, by the computing system, an interface of the client device to present output data corresponding to the model output data.

Clause 14. A system comprising: one or more processors; and one or more computer-readable mediums encoded with instructions which, when executed by the one or more processors, cause the system to: receive file data corresponding to an application programming interface (API) specification for an API; extract metadata associated with API specification from the file data, the metadata associated with an API endpoint of the API; based on the metadata, generate, by a first generative model, an executable function associated with the API endpoint, wherein the executable function is configured for use by a second generative model to generate an API call to the API endpoint; and implement the executable function.

Clause 15. The system of clause 14, wherein the instructions that cause the system to generate the executable function comprise additional instructions which, when executed by the one or more processors, further cause the system to: generate, by an embedding model, embedding data corresponding to the metadata; and using the embedding data, generate, by the first generative model, the executable function.

Clause 16. The system of clause 14 or clause 15, wherein: the metadata associated with the API specification indicates a schema for interacting with the API endpoint; and the executable function is generated based on the schema.

Clause 17. The system of any of clauses 14-16, wherein the one or more computer-readable mediums are further encoded with additional instructions which, when executed by the one or more processors, further cause the system to: extract the metadata associated with the API specification from the file data, the metadata associated with a first API endpoint and a second API endpoint of the API; based on the metadata, generate, by the first generative model, a first executable function associated with the first API endpoint, wherein the first executable function is configured for use by the second generative model to generate an API call to the first API endpoint; based on the metadata, generate, by the first generative model, a second executable function associated with the second API endpoint, wherein the second executable function is configured for use by the second generative model to generate an API call to the second API endpoint; and implement the first executable function and the second executable function Clause 18. The system of any of clauses 14-17, wherein the one or more computer-readable mediums are further encoded with additional instructions which, when executed by the one or more processors, further cause the system to: based on the metadata, determine a contract test corresponding to an expected result of an API call to the API endpoint to perform a first action; based on the executable function, determine a first API call to the API endpoint to perform the first action; execute the first API call; determine an API response associated with execution of the first API call; based on the contract test and the API response, determine the executable function is valid; and implement, by a component, the executable function, wherein the component is configured to execute the API call to the API endpoint.

Clause 19. The system of clause 18, wherein the one or more computer-readable mediums are further encoded with additional instructions which, when executed by the one or more processors, further cause the system to: based on the metadata, generate, by the first generative model, the component, wherein: the component implements a set of executable functions including the executable function; and the component is configured to identify, from the set of executable functions, a subset of executable functions authorized for access by the second generative model based on a user authentication token.

Clause 20. The system of any of clauses 14-19, wherein the executable function corresponds to a first executable function, and the one or more computer-readable mediums are further encoded with additional instructions which, when executed by the one or more processors, further cause the system to: receive, from a client device, a user input; determine a user authentication token corresponding to a user profile associated with the user input; based on the user authentication token, determine, from a set of executable functions, a subset of executable functions configured to interact with one or more APIs, the subset of executable functions including the first executable function; based on user input, the user authentication token, and the first executable function, generate, by the second generative model, a first API call for the API to perform an action responsive to the user input, the first API call including the user authentication token; execute the first API call to cause the API to perform the action in accordance with the user authentication token; based on executing the first API call, receive API response data corresponding to performance of the action by the API; based on the API response data and the user input, generate, by the second generative model, model output data corresponding to a response to the user input; and cause an interface of the client device to present output data corresponding to the model output data.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-implemented method, comprising:

receiving, by a computing system and from a client device, a user input;

determining, by the computing system, a user authentication token corresponding to a user profile associated with the user input;

determining, by the computing system, based on the user authentication token, for a first executable function of a set of executable functions configured to interact with one or more application programming interfaces (APIs), whether the user profile is authorized to access a first API with which the first executable function is configured to interact;

including the first executable function in a subset of one or more executable functions when it is determined, based on the user authentication token, that the user profile is authorized to access the first API;

based on the user input, the user authentication token, and the first executable function, generating, by a generative model of the computing system, an API call for the first API to perform an action responsive to the user input, the API call including the user authentication token;

executing, by the computing system, the API call to cause the first API to perform the action in accordance with the user authentication token;

based on executing the API call, receiving, by the computing system, API response data corresponding to performance of the action by the first API;

based on the API response data and the user input, generating, by the generative model, model output data corresponding to a response to the user input; and causing, by the computing system, an interface of the client device to present output data corresponding to the model output data.

2. The computer-implemented method of claim 1, wherein the first of executable function is associated with API specification information associated with the first API and the method further comprises:

based on the user input, the user authentication token, and the API specification information, generating, using the generative model, the API call.

3. The computer-implemented method of claim 1, wherein each executable function of the subset of one or more executable functions is associated with a description of one or more actions associated with that executable function, and the method further comprises:

determining, by the generative model, for each executable function of the subset of one or more executable functions, a relevance of that executable function to the user input based on the description of the one or more actions action associated with that executable function; and based on the relevance of the executable functions of the subset of one or more executable functions to the user input, generating, by the generative model, the API call using the user input, the user authentication token, and the first executable function.

4. A computer-implemented method comprising:

receiving, by a computing system, file data corresponding to an application programming interface (API) specification for an API;

extracting, by the computing system, metadata associated with the API specification from the file data, the metadata associated with a first API endpoint and a second API endpoint of the API;

based on the metadata, generating, by a first generative model of the computing system, a first executable function associated with the first API endpoint, wherein the first executable function is configured for use by a second generative model to generate a first API call to the first API endpoint;

based on the metadata, generating, by the first generative model, a second executable function associated with the second API endpoint, wherein the second executable function is configured for use by the second generative model to generate a second API call to the second API endpoint; and implementing, by the computing system, the first executable function and the second executable function.

5. The computer-implemented method of claim 4, wherein generating the first executable function comprises:

generating, by an embedding model of the computing system, embedding data corresponding to the metadata; and using the embedding data, generating, by the first generative model, the first executable function.

6. The computer-implemented method of claim 4, wherein:

the metadata associated with the API specification indicates a schema for interacting with the first API endpoint; and the first executable function is generated based on the schema.

7. The computer-implemented method of claim 4, further comprising:

implementing, by a component of the computing system, the first executable function, wherein the component is configured to execute the first API call to the first API endpoint.

8. The computer-implemented method of claim 7, further comprising:

based on the metadata, generating, by the first generative model, the component.

9. The computer-implemented method of claim 8, wherein:

the component is configured to implement a set of executable functions including the first executable function; and the component is further configured to identify, from the set of executable functions, a subset of executable functions authorized for access by the second generative model based on a user authentication token.

10. The computer-implemented method of claim 7, further comprising:

based on the metadata, determining a contract test corresponding to an expected result of an API call to the first API endpoint to perform a first action;

based on the first executable function, determining a third API call to the first API endpoint to perform the first action;

executing the third API call;

determining an API response associated with execution of the third API call;

based on the contract test and the API response, determining the first executable function is valid; and based on determining the first executable function is valid, implementing, by the computing system, the component.

11. The computer-implemented method of claim 4, further comprising:

receiving, by the computing system and from a client device, a user input;

determining a user authentication token corresponding to a user profile associated with the user input;

based on the user authentication token, determining, from a set of executable functions, a subset of executable functions configured to interact with one or more APIs, the subset of executable functions including the first executable function;

based on the user input, the user authentication token, and the first executable function, generating, by the second generative model, the first API call for the API to perform an action responsive to the user input, the first API call including the user authentication token;

executing the first API call to cause the API to perform the action in accordance with the user authentication token;

based on executing the first API call, receiving API response data corresponding to performance of the action by the API;

based on the API response data and the user input, generating, by the second generative model, model output data corresponding to a response to the user input; and causing, by the computing system, an interface of the client device to present output data corresponding to the model output data.

12. A system, comprising:

one or more processors; and one or more computer-readable mediums encoded with instructions which, when executed by the one or more processors, cause the system to:

receive file data corresponding to an application programming interface (API) specification for an API;

extract metadata associated with the API specification from the file data, the metadata associated with a first API endpoint of the API;

based on the metadata, generate, by a first generative model, a first executable function associated with the first API endpoint, wherein the first executable function is configured for use by a second generative model to generate a first API call to the first API endpoint; and generate, by the first generative model, a component based on the metadata, wherein the component is configured to:

implement a set of executable functions including the first executable function, identify, from the set of executable functions, a subset of one or more executable functions authorized for access by the second generative model based on a user authentication token, and execute the first API call to the first API endpoint.

13. The system of claim 12, wherein the instructions that cause the system to generate the first executable function comprise additional instructions which, when executed by the one or more processors, further cause the system to:

generate, by an embedding model, embedding data corresponding to the metadata; and using the embedding data, generate, by the first generative model, the first executable function.

14. The system of claim 12, wherein:

the metadata associated with the API specification indicates a schema for interacting with the first API endpoint; and the first executable function is generated based on the schema.

15. The system of claim 12, wherein the metadata is further associated with a second API endpoint of the API, and the one or more computer-readable mediums are further encoded with additional instructions which, when executed by the one or more processors, further cause the system to:

based on the metadata, generate, by the first generative model, a second executable function associated with the second API endpoint, wherein the second executable function is configured for use by the second generative model to generate a second API call to the second API endpoint; and implement the first executable function and the second executable function.

16. The system of claim 12, wherein the one or more computer-readable mediums are further encoded with additional instructions which, when executed by the one or more processors, further cause the system to:

based on the metadata, determine a contract test corresponding to an expected result of an API call to the first API endpoint to perform a first action;

based on the first executable function, determine a third API call to the first API endpoint to perform the first action;

execute the third API call;

determine an API response associated with execution of the third API call;

based on the contract test and the API response, determine the first executable function is valid; and based on the determination that the first executable function is valid, implement, by the component, the first executable function.

17. The system of claim 12, wherein the one or more computer-readable mediums are further encoded with additional instructions which, when executed by the one or more processors, further cause the system to:

receive, from a client device, a user input;

determine a first user authentication token corresponding to a user profile associated with the user input;

based on the first user authentication token, determine, using the component, from the set of executable functions, the first executable function;

based on the user input, the first user authentication token, and the first executable function, generate, by the second generative model, the first API call, wherein the first API call is for the API to perform an action responsive to the user input, the first API call including the first user authentication token;

execute the first API call to cause the API to perform the action in accordance with the first user authentication token;

based on executing the first API call, receive API response data corresponding to performance of the action by the API;

based on the API response data and the user input, generate, by the second generative model, model output data corresponding to a response to the user input; and cause an interface of the client device to present output data corresponding to the model output data.

* * * * *